(12) United States Patent
Bock et al.

(10) Patent No.: US 11,279,440 B2
(45) Date of Patent: Mar. 22, 2022

(54) DRIVING DEVICE FOR AN ELECTRIC BICYCLE WITH PIVOTABLE MOTOR CONNECTOR

(71) Applicant: Brose Antriebstechnik GmbH & Co. Kommanditgesellschaft, Berlin, Berlin (DE)

(72) Inventors: Michael Bock, Berlin (DE); Markus Heinz, Berlin (DE)

(73) Assignee: Brose Antriebstechnik GmbH & Co. Kommanditgesellschaft, Berlin, Berlin (DE)

( * ) Notice: Subject to any disclaimer, the term of this patent is extended or adjusted under 35 U.S.C. 154(b) by 274 days.

(21) Appl. No.: 16/575,923

(22) Filed: Sep. 19, 2019

(65) Prior Publication Data
US 2020/0094916 A1   Mar. 26, 2020

(30) Foreign Application Priority Data
Sep. 25, 2018   (DE) ..................... 10 2018 216 376.6

(51) Int. Cl.
| | |
|---|---|
| *B62M 6/40* | (2010.01) |
| *B60L 50/64* | (2019.01) |
| *B60L 50/60* | (2019.01) |
| *B60L 53/80* | (2019.01) |
| *B62K 3/06* | (2006.01) |
| *B62M 6/90* | (2010.01) |

(52) U.S. Cl.
CPC .............. *B62M 6/40* (2013.01); *B60L 50/64* (2019.02); *B60L 50/66* (2019.02); *B60L 53/80* (2019.02); *B62K 3/06* (2013.01); *B62M 6/90* (2013.01); *B60L 2200/12* (2013.01)

(58) Field of Classification Search
CPC . B62M 6/40; B62M 6/90; B60L 50/64; B60L 50/66; B60L 53/80; B60L 2200/12; B62K 3/06; Y02T 90/14; Y02T 10/7072; Y02T 10/70
See application file for complete search history.

(56) References Cited

U.S. PATENT DOCUMENTS

| | | | |
|---|---|---|---|
| 9,611,003 B1* | 4/2017 | Yu | B62M 6/90 |
| 9,745,019 B2* | 8/2017 | Evensen | H01M 50/20 |
| 9,902,457 B2* | 2/2018 | Hu | H01M 50/20 |
| 10,183,591 B2* | 1/2019 | Shieh | B60L 50/64 |
| 10,381,616 B2* | 8/2019 | Hsia | B62K 19/30 |

(Continued)

FOREIGN PATENT DOCUMENTS

| | | |
|---|---|---|
| DE | 102016103506 A1 | 8/2017 |
| DE | 102018200891 A1 | 7/2018 |

(Continued)

*Primary Examiner* — Minnah L Seoh
*Assistant Examiner* — Marlon A Arce
(74) *Attorney, Agent, or Firm* — Brooks Kushman P.C.

(57) ABSTRACT

A drive apparatus for an electric bicycle with an electric motor, an energy storage unit for supplying the electric motor with electrical energy, and a carrier at which the energy storage unit is releasably held, wherein a first plug connector is provided at the energy storage unit and a second plug connector is provided at the carrier which plug connector is connected to the first plug connector to connect the energy storage unit to the electric motor. The first plug connector is mounted in a pivotable manner at the carrier about a first pivot axis.

13 Claims, 6 Drawing Sheets

(56) References Cited

U.S. PATENT DOCUMENTS

| | | | |
|---|---|---|---|
| 11,024,917 B2* | 6/2021 | Trif | B62J 43/13 |
| 2010/0237585 A1* | 9/2010 | Binggeli | B62M 6/90 |
| | | | 280/288.4 |
| 2013/0241169 A1* | 9/2013 | Talavasek | B62M 6/90 |
| | | | 280/274 |
| 2016/0311494 A1* | 10/2016 | Schliewert | B62K 19/30 |

FOREIGN PATENT DOCUMENTS

| | | |
|---|---|---|
| EP | 2230164 A1 | 9/2010 |
| EP | 3118096 A1 | 1/2017 |

* cited by examiner

DRIVING DEVICE FOR AN ELECTRIC BICYCLE WITH PIVOTABLE MOTOR CONNECTOR

CROSS-REFERENCE TO RELATED APPLICATIONS

This application claims priority to German patent application Serial No. DE 10 2018 216 376.6 filed Sep. 25, 2018, the disclosure of which is hereby incorporated in its entirety by reference herein.

TECHNICAL FIELD

The present disclosure relates to a drive apparatus for use in an electric bicycle provided with an electric motor and an energy storage unit for supplying the electric motor with electrical energy.

BACKGROUND

In electric bicycles, an energy storage unit, for example with at least one accumulator, is provided and held at a carrier for supplying at least one electric motor of the electric bicycle with electrical energy. Such a carrier may, for example, be part of a frame of the electric bicycle, or a component to be joined to such a frame. The energy storage unit here is then regularly held releasably at the carrier that is fixed to the frame, so that when necessary the energy storage unit may be removed from the carrier, for example in order to be able to connect the energy storage unit to a separate charging device.

Plug connectors are usually provided for making the electrical contact. In this way a first plug connector of the energy storage unit may be connected to a second plug connector provided at the carrier, in order to electrically connect the energy storage unit attached to the carrier to the electric motor (or multiple electric motors) and to be able to supply the electric motor with current. So-called blade contacts are also known from practice in order to connect an energy storage unit to the electric motor and in that way to achieve a connection to the electric motor.

SUMMARY

A drive apparatus for an electric bicycle is proposed below that may include a first plug connector of the energy storage unit is mounted in a pivotable manner at a carrier, at which the energy storage unit is releasably held and at which a second plug connector connected to the first plug connector is provided, about a first pivot axis.

The carrier-side plug connector may be mounted in a pivotable manner about a first pivot axis, and is thus provided movably at the carrier. The first plug connector at the carrier may provide a possible displacement of the energy storage unit with respect to the carrier, without an electrical connection between the electric motor of the drive apparatus and the energy storage unit being disconnected. Such a configuration further permits the use of commercially usual, and therefore standardized, plug connectors without difficulty. This in turn enables a greater variability in the selection of plug, whereby cost advantages may be achieved in the manufacture of the drive apparatus.

The first plug connector may be constructed at a connecting component that is mounted in a pivotable manner at a holder of the carrier about the first pivot axis. The carrier-side holder may here be implemented as a separate component and fixed to the carrier. The holder is alternatively formed at the carrier itself.

In one or more embodiments, the connecting component forms two pivot bearing sections by means of which the connecting component is mounted in a pivotable manner at the holder. The two pivot bearing sections each comprise, for example, a pivot bearing pin that is mounted in a pivotable manner at the holder.

In a development based on this, the connecting component is accommodated for example at least partially in an intermediate space between two bearing sections of the holder, and mounted in a pivotable manner by way of the two pivot bearing sections at the two holder-side bearing sections. The two bearing sections of the holder are accordingly spaced apart with respect to one another by the intermediate space. The two bearing sections for example form legs of a U-shaped or V-shaped bearing area of the holder.

In one or more embodiments, the energy storage unit is also mounted in a pivotable manner at the holder about a second pivot axis for the connecting component with the first plug connector. At least one further pivot or rotating bearing is thus provided at the holder in order to specify a second pivot axis for the energy storage unit. The carrier-side holder thus integrates at least one additional function. The energy storage unit may here be pivotable about the second pivot axis between an operating position and a removal position. The energy storage unit is located for example in the operating position when the at least one electric motor is supplied with current by way of the energy storage unit, and the electric bicycle is thus ready for operation and it is possible to ride with electric motor assistance. In the removal position, the energy storage unit may on the other hand be separated from the carrier (and thereby from the electric bicycle), for example in order to connect the energy storage unit to a separate charging device.

At least one plug section may be provided at the energy storage unit which section is inserted at a pivot bearing section of the holder that defines the second pivot axis. The energy storage unit may be joined without the use of tools to the carrier-side holder and also released again without the use of tools from the carrier-side holder by means of the plug connection between the pivot bearing section of the holder and the plug section of the energy storage unit. At the same time, a pivot bearing of the energy storage unit at the carrier-side holder is achieved through this plug connection, so that the energy storage unit may be pivoted between an operating position and a removal position. The energy storage unit may, for example, thus be pivotable about the pivot axis between the operating position and the removal position, wherein in the removal position the plug section may easily be withdrawn from the pivot bearing section in order to remove the energy storage unit from the carrier. Conversely, the energy storage unit may be plugged onto the pivot bearing section of the holder by means of its at least one plug section, in order subsequently to be pivoted out of the removal installation adopted in this way at the pivot bearing section about the second pivot axis thereby defined into the operating position at the carrier.

The pivot bearing section of the holder is, for example, designed as a rod or pin. For the attachment in the approved manner of the energy storage unit which, for example, comprises an accumulator, the energy storage unit is then subsequently plugged by means of at least one plug section to a rod-shaped or pin-shaped pivot bearing section of the holder, and then pivoted about a second pivot axis defined by this rod-shaped or pin-shaped pivot bearing section into an operating position at the carrier. The energy storage unit is then locked in this operating position, so that an electric bicycle fitted with the drive apparatus according to the proposed solution is again ready for operation.

The second pivot axis for the energy storage unit may in principle run parallel to the first pivot axis for the first plug connector. A pivoting movement of the energy storage unit between its operating position and its removal position at the carrier may thus be completed without difficulty by the first carrier-side plug connector.

In one or more embodiments, the first plug connector is mounted in a repositionable manner at the carrier perpendicular to the first pivot axis. The additional ability to reposition the first plug connector perpendicularly to its first pivot axis may on the one hand simplify the connection to the second plug connector of the energy storage unit. On the other hand, the carrier-side (and therefore motor-side) first plug connector may, due to the additional ability to reposition, complete a translatory movement possibly even only slightly overlaid onto a pivoting movement of the energy storage unit during a transfer from an operating position into a removal position or vice versa without difficulty, without a connection between the first and second plug connectors necessarily being disconnected here. For example, a connecting component comprising the first plug connector may also in addition be mounted in a repositionable manner perpendicular to the first pivot axis by means of the two pivot bearing sections through which the connecting component is mounted in a pivotable manner at the holder. In this variant, the two pivot bearing sections of the connecting component thus on the one hand ensure an ability to pivot about the first pivot axis as well as an ability to reposition perpendicular to the first pivot axis at the holder. For this purpose, the plug-side pivot bearing sections are each then for example mounted rotatably and in a repositionable manner in a bearing guide that extends perpendicularly to the first pivot axis at an associated bearing section of the holder. In this way the connecting component with the first plug connector may be repositioned along an extension axis of the bearing guides of the two bearing sections that lie opposite one another. The connecting component may at the same time pivot about the first pivot axis which is defined by the rotatable bearing of the pivot bearing sections at the bearing guides.

Alternatively or in addition the first plug connector may be spring-loaded perpendicularly to the first pivot axis. In other words, in this variant embodiment the first plug connector is preloaded by means of at least one spring element in a direction perpendicular to the first pivot axis. Through a spring-loading of the first carrier-side plug connector it is possible, for example, for the first plug connector always to adopt a specific relative position due to the action of at least one spring element. The spring-loading of the first plug connector serves, for example, to center the first plug connector after connection in the approved manner to the second plug connector of the energy storage unit after an attachment of the energy storage unit to the carrier.

In one or more embodiments, it is, for example, provided that the first plug connector is spring-loaded by at least one spring element arranged between the two bearing sections between which the intermediate space for the at least partial housing of the connecting component is present. Such a spring element is then for example supported at one connecting section of the holder that joins the two bearing sections on the one hand and at the connecting component on the other hand. The at least one spring element is, for example, designed as a compression spring.

In one or more embodiments, the first plug connector comprises a round plug. The second plug connector may, alternatively or in addition, comprise a round plug. Such a round plug may be a commercially usual plug connector for making electrical contact. The use of a commercially usual round plug is possible without difficulty due to the proposed pivotable bearing of the first plug connector. Other plug geometries are, of course, also conceivable, however.

The carrier may, fundamentally, be formed by a frame for the electric bicycle, in particular by a frame part of the frame, e.g. in the form of a frame tube. In an alternative variant embodiment, the carrier is formed by a component that is to be mounted on a frame for the electric bicycle. Thus whereas in the first-mentioned variant the carrier with the first plug connector mounted in a pivotable manner thereon is formed by the frame of the electric bicycle itself or at least by a frame part, the most recently described variant provides a component as carrier that is subsequently mounted on the frame of the electric bicycle and fixed to it. Fundamentally, however, when the drive apparatus is in the state mounted on the electric bicycle in the approved manner, the carrier is a component fixed to the frame to which the energy storage unit may be attached and from which it may be removed again when necessary.

The proposed solution further also comprises an electric bicycle with a variant embodiment of a proposed drive apparatus.

BRIEF DESCRIPTION OF THE DRAWINGS

The appended figures clarify possible variant embodiments of the proposed solution by way of example.

Here.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A drive apparatus known from EP 3 118 096 A1, an energy storage unit is further, for example, proposed wherein at least one first plug connector is provided at an upper side. This first plug connector is inserted at a carrier-side second plug connector when the energy storage unit is mounted in the approved manner to a lower tube of the bicycle frame fixed to the frame as a carrier. The plug connections proposed here are evidently manufacturer-specific, and cannot be easily standardized. An electrical connection between the energy storage unit and the electric motor is, moreover, only given in precisely one operating position of the energy storage unit. If the energy storage unit at the carrier is transferred after the release of a locking system into a removal position, the connection to the electric motor and to corresponding control electronics is immediately disconnected. Any functions supplied with electrical energy by way of the energy storage unit are thus no longer available at the electric bicycle, even if, for example, the energy storage unit is only slightly displaced with respect to the carrier.

Figure 6:
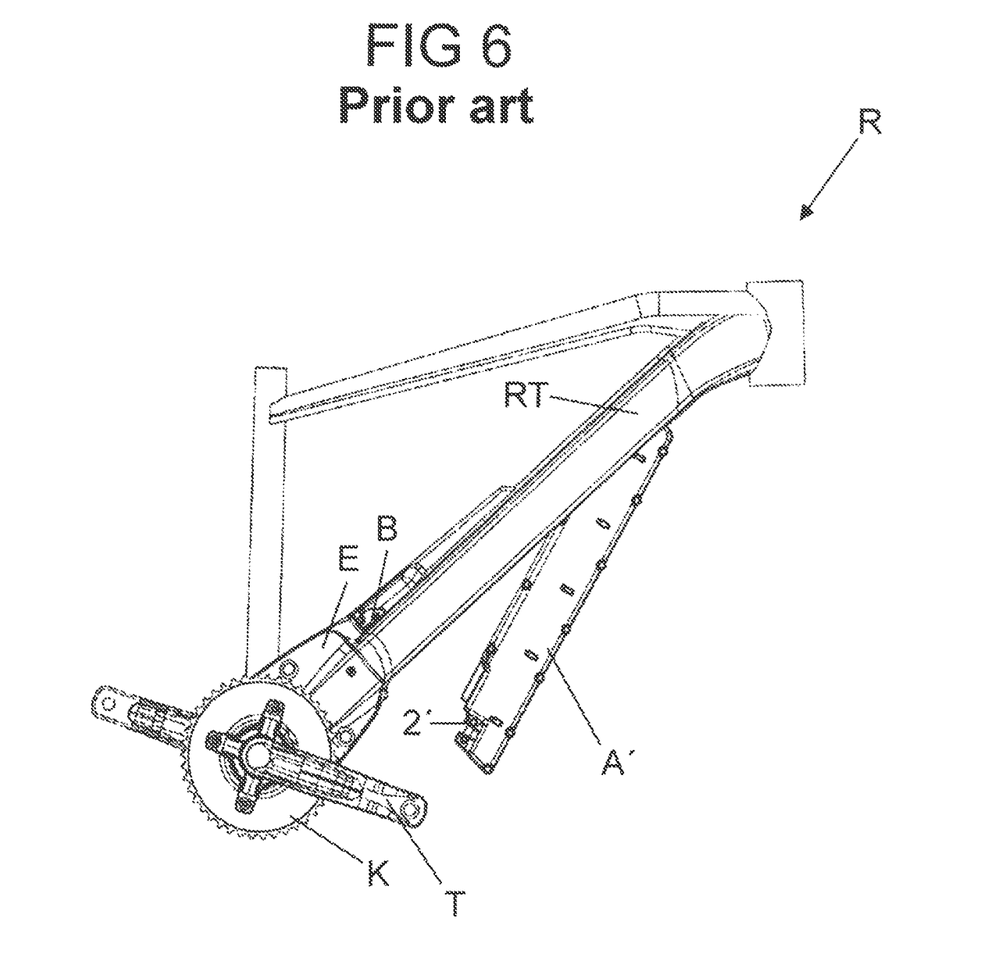
FIG. 6 shows a side view of a bicycle frame designed as a carrier from the prior art which comprises a frame part with an accumulator fastened thereon, which is illustrated in a removal installation in FIG. 6.

FIG. 6 shows an embodiment, known from the prior art, for example from EP 3 118 096 A1, of a drive apparatus with electric motor for an electric bicycle on a bicycle frame R. The bicycle frame R comprises a plurality of frame tubes joined together, including in particular a frame part in the form of a down tube RT. A housing of an electric motor E is fixed in particular to this down tube RT. A chain ring K, which may in addition also be driven by a pedal crank T, is coupled to this electric motor E.

An energy storage unit A' in the form of an accumulator is provided for supplying the electric motor E with electrical energy. This accumulator A' is fastened to the down tube RT. The longitudinally extended accumulator A' may here be inserted onto an end of the down tube RT facing away from the electric motor E into a receptacle of the down tube RT. The front end of the accumulator A' may then, through the inserted end of the accumulator A', be folded into the receptacle formed at the lower side of the down tube RT.

At the end of the accumulator A' that is to be folded in, an accumulator-side (second) plug connector is provided in the form of a connecting plug 2'. This accumulator-side connecting plug 2' is plugged onto a motor-side (first) plug connector in the form of a connecting plug which connector is provided inside the receptacle of the down tube RT when the accumulator A' is folded completely into the receptacle of the down tube RT in the approved manner and accommodated therein. An actuating handle B is provided at the upper side of the down tube RT to release the accumulator A' from the down tube RT and in particular to release the electrically conductive connection between the connecting plugs.

Whereas the specifically designed connecting plugs, in particular the accumulator-side connecting plug 2' of the variant embodiment of a drive apparatus of FIG. 6 known from the prior art, are each rigid and immovable, and are therefore not coupled together in the approved manner until the accumulator A' is fully inserted into the receptacle of the down tube RT, and only then, a variant embodiment of the proposed solution provides that a carrier-side respectively motor-side plug connector is mounted in a pivotable manner.

In the variant embodiment illustrated in FIGS. 1A to 5 a holder 1 is fixed for this purpose to a frame part RT of a bicycle frame which mounts a motor-side connecting plug 100 in a pivotable manner. The interior of the frame parts RT, for example in the form of a down tube according to the bicycle frame R of FIG. 6, here defines a receptacle for an accumulator A. This accumulator A is attached at the holder 1 so that the accumulator A may be pivoted about a second pivot axis D2 defined at the holder 1 in the receptacle at the frame part RT. The accumulator A here is, already in a position that is not fully folded in, electrically connected via a coupling of an accumulator-side connecting plug 2 to the motor-side connecting plug 100 with an electric motor (e.g. an electric motor E according to FIG. 6). With the electrical connection to the electric motor now already established, the accumulator A may then be folded into its operating position. In that the motor-side connecting plug 100 is mounted in a pivotable manner at the holder 1 about a first pivot axis D1, which extends parallel to the second pivot axis D2, the motor-side connecting plug 100 may complete such a folding or pivoting movement about the second pivot axis D2.

Figure 1A:
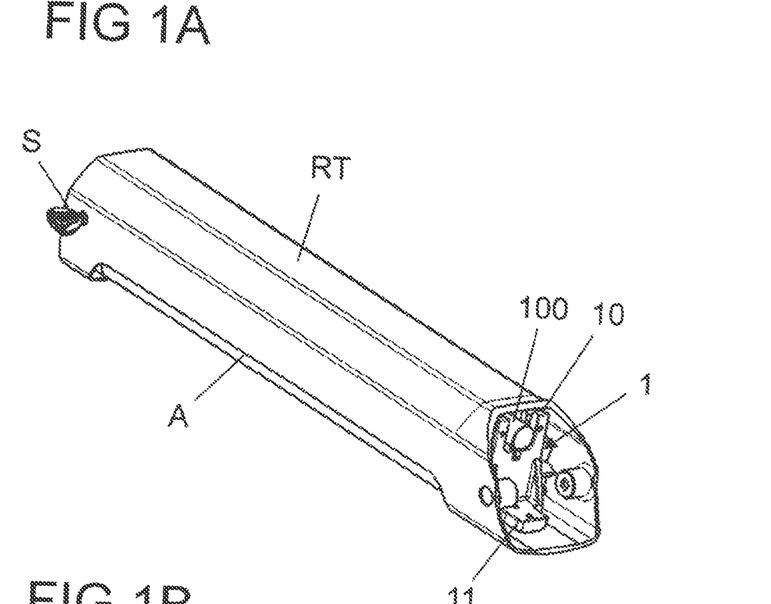
FIG. 1A shows a carrier of a variant embodiment of a proposed drive apparatus with an energy storage unit in the form of an accumulator attached thereto.

In FIG. 1A the frame part RT is illustrated with the accumulator A folded in and thereby located in its operating position. It may be seen in particular here from the perspective view of FIG. 1A that the holder 1 is of L-shaped design when viewed from the side for the pivotable mounting of the motor-side connecting plug 100. The holder is fixed here by means of a base 11 to an inner wall inside the hollow frame part RT. A bearing area 10 on which the motor-side connecting plug 100 is mounted in a pivotable manner extends from the base 11.

The accumulator A may be locked in the operating position of FIG. 1A by means of a lock S. If the lock S is open, the accumulator A may be removed from the frame part RT, for example in order to charge the accumulator A at a separate charging device. For the removal from the frame part RT, the accumulator A is here pivoted outward about the second pivot axis D2 (compare in particular FIGS. 2 and 3A-3B), so that an end of the accumulator A that faces away from the holder 1 is folded out from the interior of the frame part RT.

Figure 2:
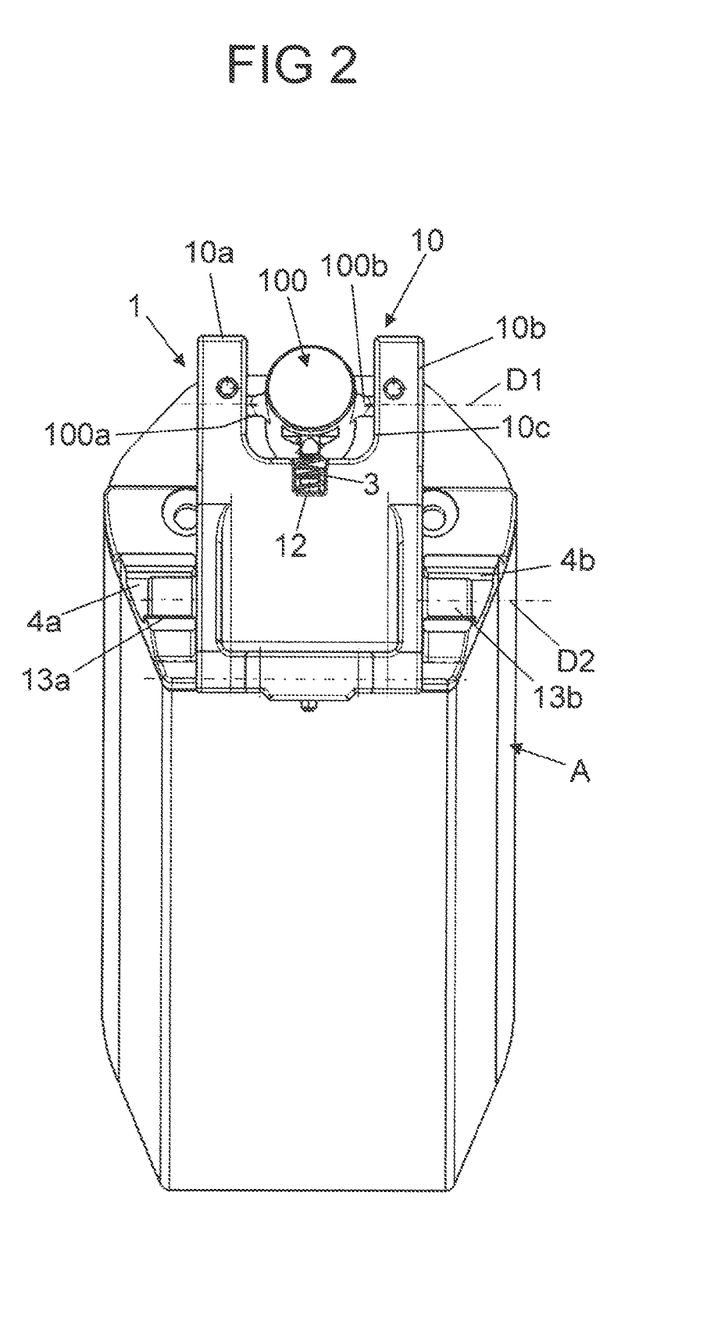
FIG. 2 shows a front view of a holder of the carrier of FIGS. 1A and 1B on which a first plug connector of the carrier side, and thus of the motor side, is mounted in a pivotable manner, together with the accumulator in the removal installation.
Figure 3A:
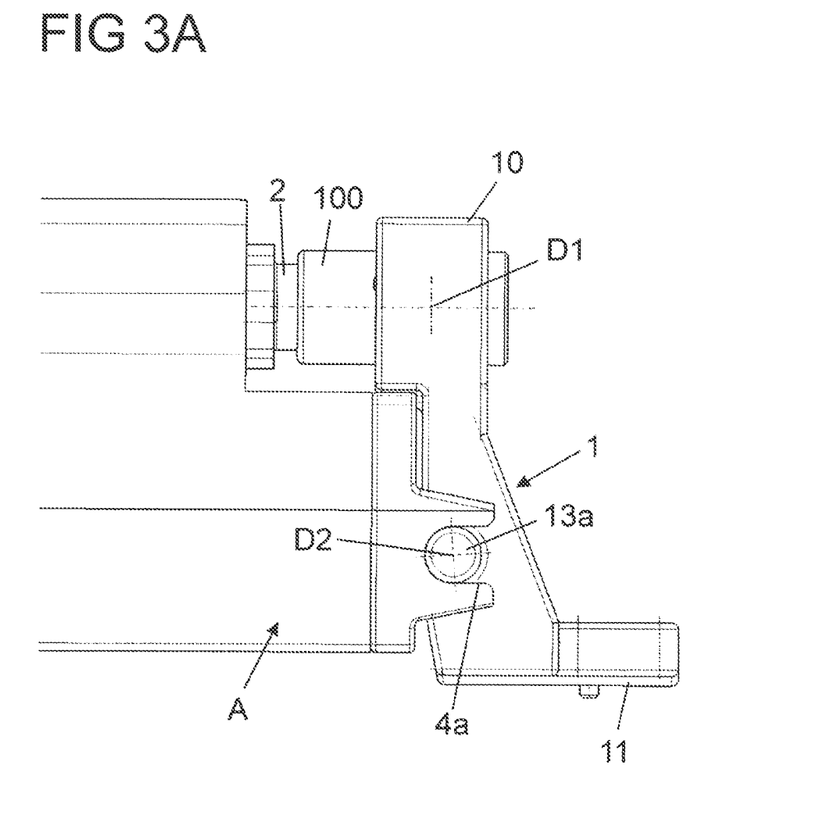
FIG. 3A shows details with an enlarged scale and sections of the holder with the motor-side first plug connector which is connected to an accumulator-side second plug connector, and the accumulator in an operating position folded against the carrier.
Figure 3B:
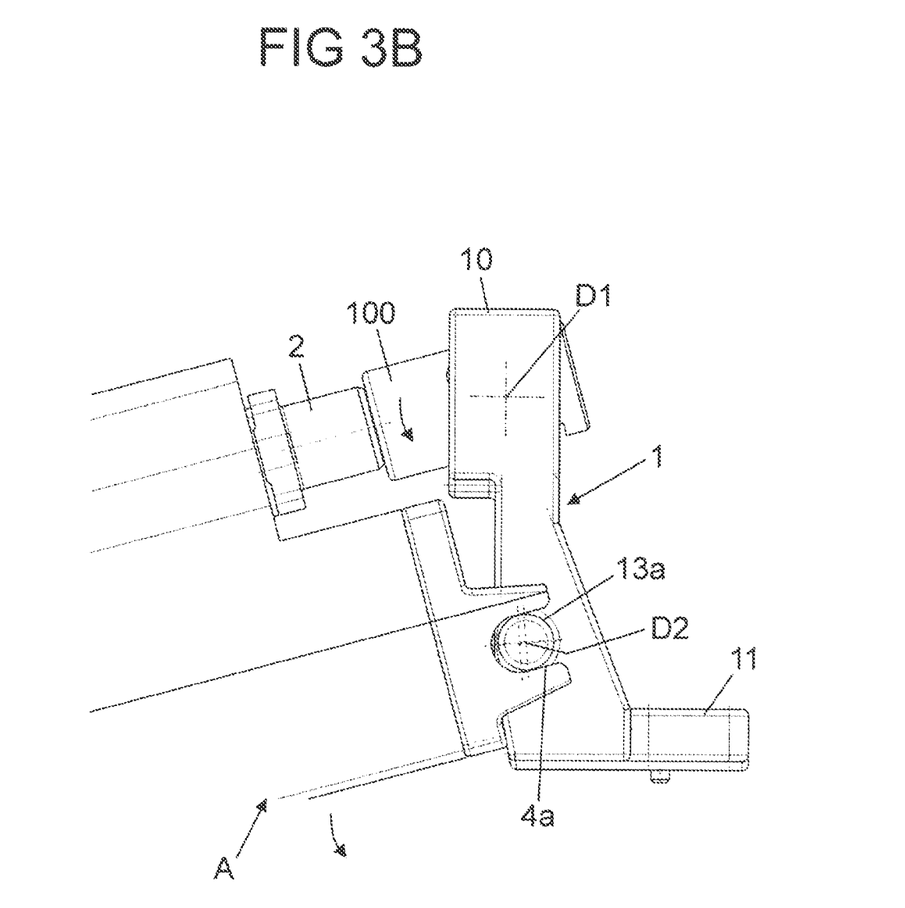
FIG. 3B shows a view of the carrier in accordance with FIG. 3A and the accumulator pivoted into its removal installation and already withdrawn.

As can be seen from the overall view of FIGS. 2, 3A and 3B, the accumulator A has two plug sections, each in the form of a plug jaw 4a, 4b at the other end of said accumulator facing toward the holder 1. The accumulator A is inserted at a pivot bearing section in the form of a pivot bearing pin 13a or 13b of the holder 1 by means of each plug jaw 4a, 4b. These pivot bearing pins 13a and 13b protrude at sides of the holder 1 facing away from one another, and physically define the second pivot axis D2 for the accumulator A. The accumulator A is inserted by means of the plug jaws 4a, 4b at the pivot bearing pins 13a and 13b on both sides of the holder 1, so that each pivot bearing pin 13a and 13b is respectively surrounded by an associated plug jaw 4a, 4b and thus establishes a positive-lock connection between the accumulator A and the holder 1, by means of which connection the accumulator A may be pivoted at the holder 1 between its operating position and its removal position. The accumulator A may here also be inserted by means of the associated end along the longitudinal axis of the accumulator A at the holder 1 by means of the plug jaws 4a and 4b which are open to one side along a longitudinal axis of the accumulator A. The accumulator A is then pivoted out of the removal installation adopted hereby into an operating position in which the accumulator A is accommodated in the receptacle of the frame part RT.

The accumulator-side second connecting plug 2 is designed in the present case as a round plug, and is inserted into a socket of the motor-side first connecting plug 100 in order to establish an electrically conductive connection between the accumulator A and the electric motor. In order in particular to enable the use here of standardized and commercially usual connecting plugs 100 and 2, the motor-side connecting plug 100 is mounted at a U-shaped upper end of the bearing area 10 in a pivotable manner about the first pivot axis D1. For this purpose the motor-side first connecting plug 100 comprises two pivot bearing pins 100a and 100b as plug-side pivot bearing sections. Each pivot bearing pin 100a, 100b of the connecting plug 100 is mounted in a pivotable manner at an associated bearing section of the bearing area 10 in the form of a bearing leg 10a or 10b. An intermediate space 10c is formed between the bearing legs 10a and 10b in which the motor-side first connecting plug 100 is accommodated and mounted in a pivotable manner by the pivot bearing pins 100a and 100b which are held rotatably at the bearing legs 10a and 10b.

Figure 4:
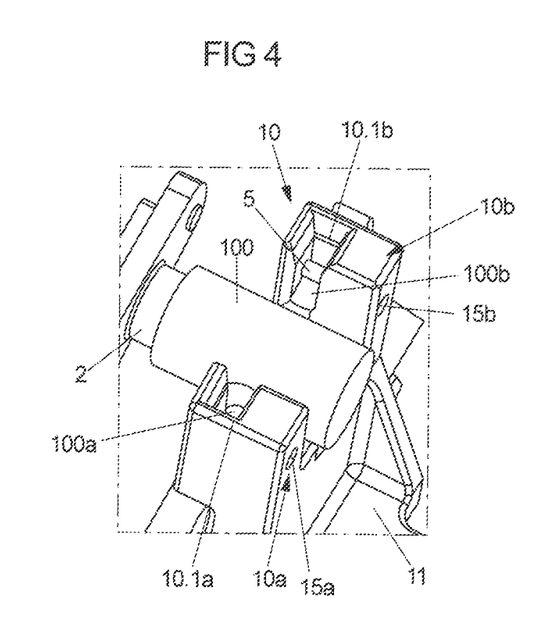
FIG. 4 shows a perspective view and sections of the holder with a view of an upper side of two bearing sections on which the motor-side first plug connector is mounted in a pivotable manner.

As can be seen in particular from the perspective plan view of FIG. 4, each of the bearing legs 10a, 10b forms a bearing guide in the form of a bearing slot 10.1a or 10.1b. The bearing slots 10.1a and 10.1b here run parallel to one another and perpendicularly to the first pivot axis D1. Upward, i.e. toward a free end of the bearing legs 10a and 10b that face away from the base 11, the bearing slots 10.1a and 10.1b are each open, so that the motor-side connecting plug 100 may be inserted from above at the bearing area 10 during assembly with its plug-side pivot bearing pins 100a and 100b. In order to then prevent a removal of the motor-side connecting plug 100 from the bearing area 10 of the holder 1, a securing pin 5 is inserted at each bearing leg 10a, 10b. This securing pin 5 is inserted into a pin hole 15a or 15b of a bearing leg 10a or 10b, so that the securing pin 5 respectively extends with a section through the respective bearing slot 10.1a or 10.1b. By this means the securing pin 5 respectively prevents a displacement of the plug-side pivot bearing pin 100a or 100b held in the respective bearing slot 10.1a or 10.1b by more than a permissible extent in the direction of the end of the respective bearing leg 10a or 10b. A plug-side pivot bearing pin 100a, 100b may thus not be pushed past the rigid securing pin 5.

Figure 5:
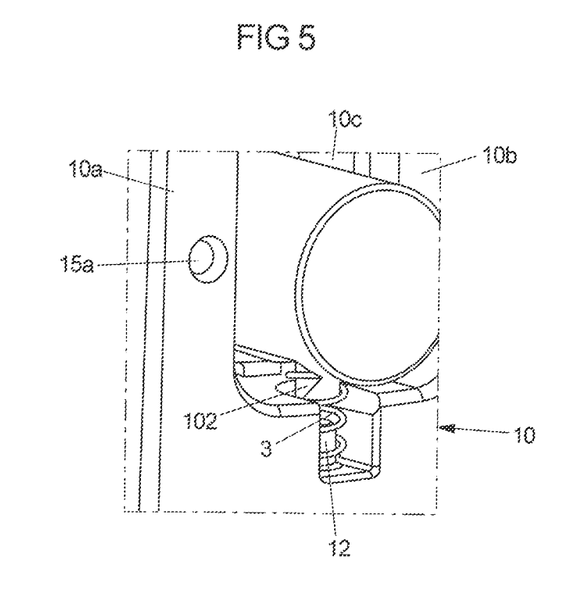
FIG. 5 shows sections and details with an enlarged scale of the motor-side first plug connector with a view of a spring-loading at the holder.

The motor-side first connecting plug 100 is preloaded at the bearing area 10 in the direction of the free ends of the bearing legs 10a and 10b by means of a spring element in the form of a compression spring 3. The compression spring 3 which is supported both at the motor-side first connecting plug 100 and at the bearing area 10 accordingly presses the motor-side first connecting plug 100 in a direction perpendicular to the first pivot axis D1. The motor-side first connecting plug 100 is thus not only mounted in a pivotable manner about the first pivot axis D1 at the bearing area 10 of the holder 1, but also in a longitudinally movable manner by means of the bearing slots 10.1a and 10.1b, specifically perpendicular to the first pivot axis D1. The motor-side first connecting plug 100 is here spring-loaded by means of the compression spring 3 perpendicular to the first pivot axis D1.

The spring-loading of the motor-side first connecting plug 100 here ensures an automatic centered alignment of the motor-side first connecting plug 100 at the bearing area 10 of the holder 1 when the accumulator A is plugged in. In addition, by means of the spring-loading and the additional ability to reposition the motor-side first connecting plug 100 associated therewith, a coupling to the accumulator-side second connecting plug 2 is made easier when inserting the accumulator A at the frame part RT. For positioning the compression spring 3 at the motor-side first connecting plug 100, this comprises a protruding sprung pin 102 onto which an end of the compression spring 3 is pushed. In the region of the intermediate space 10c, furthermore, a holder-side sprung pin 12 is formed by the bearing area 10 at a connecting section that connects the two bearing legs 10a and 10b, onto which the other end of the compression spring 3 is pushed. In this way the compression spring 3 adopts a defined position at the holder 1, and preloads the motor-side first connecting plug 100 against the holder 1.

To remove the accumulator A from the frame part RT—after releasing the locking by the lock S—the accumulator A is pivoted out of the operating position illustrated in FIGS. 1A and 3A about the pivot bearing pins 13a and 13b that are formed at the holder 1, so that one end of the accumulator A is folded outward out of the receptacle of the frame part RT. This pivoting movement about the second pivot axis D2 is followed by the motor-side first connecting plug 100 which is mounted in a pivotable manner about the first pivot axis D1 at the holder 1 and additionally spring-loaded in a repositionable manner perpendicularly thereto.

Figure 1B:
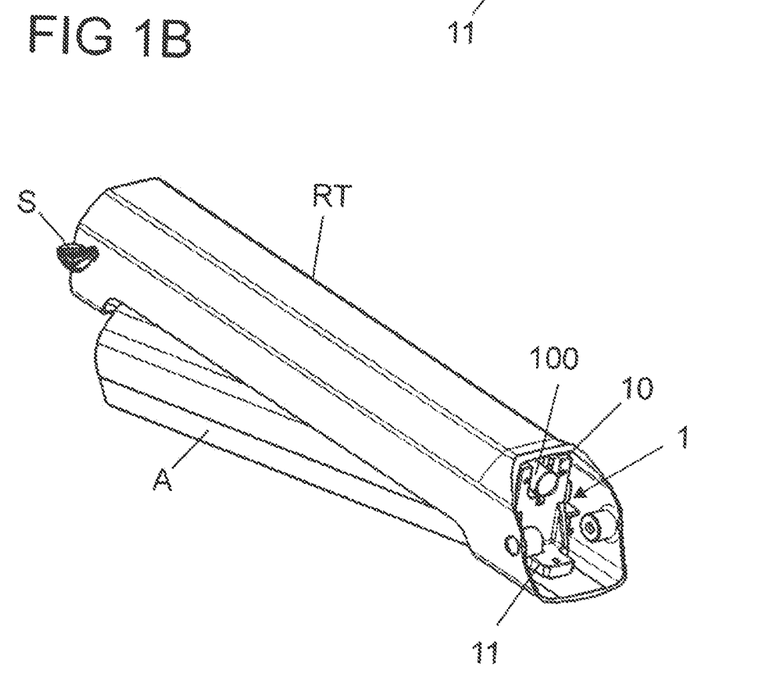
FIG. 1B shows a perspective view of the carrier in accordance with FIG. 1A with an accumulator pivoted into a removal installation.

If the accumulator A was pivoted about a predetermined pivot angle, for example in the range between 10° and 25°, outward into a removal position in accordance with FIGS. 1B, 2 and 3B, the plug connection between the connecting plugs 100 and 2 as well as the plug connections between the plug jaws 4a and 4b and the associated pivot bearing pins 13a and 13b of the holder 1 may be released, in that the accumulator A is simply withdrawn from the holder 1 perpendicularly to the second pivot axis D2 and, in the present case, along the longitudinal axis of the accumulator A.

If the accumulator A is to be attached again to the frame part RT, the accumulator A is plugged in the reverse manner by means of its plug jaws 4a and 4b in a removal position, angled with respect to the frame part RT, at the pivot bearing pins 13a and 13b of the holder 1. From the removal position adopted in this way, in which the connecting plugs 2 and 100 may then also already be connected to one another in order to establish an electrically connection between the accumulator A and an electric motor of the electric bicycle, the accumulator A is then pivoted into its operating position about the second pivot axis D2 at the pivot bearing pins 13a and 13b until the accumulator A is folded as far as possible into the receptacle of the frame part RT.

A mechanical pivot-in aid for the accumulator A, which is to be attached to the frame part RT and fastened thereto, is provided by means of the first connecting plug 100 on the carrier side and thereby the motor side, mounted in a pivotable manner on both sides at the bearing legs 10a and 10b and which, in the illustrated variant embodiment, is additionally spring-loaded perpendicularly to its first pivot axis D1. This pivot-in aid thereby enables not only a simple attachment of the accumulator A to the frame part RT and an easy removal of the accumulator A from the frame part RT. Rather does it also make it possible to use commercially usual plug connectors, for example respectively in the form of a round plug, instead of specific connecting plugs 2 and 100.

The following is a list of reference numbers shown in the Figures. However, it should be understood that the use of these terms is for illustrative purposes only with respect to one embodiment. And, use of reference numbers correlating a certain term that is both illustrated in the Figures and

| List of reference signs | |
|---|---|
| 1 | Holder |
| 10 | Bearing area |
| 10.1a, 10.1b | Bearing slot (bearing guide) |
| 100 | Motor-side connecting plug (first plug connector) |
| 100a, 100b | Pivot bearing pin (plug-side pivot bearing section) |
| 102 | Sprung pin |
| 10a, 10b | Bearing leg |
| 10c | Intermediate space |
| 11 | Base |
| 12 | Sprung pin |
| 13a, 13b | Pivot bearing pin (holder-side pivot bearing section) |
| 15a, 15b | Pin hole |
| 2, 2' | Accumulator-side connecting plug (second plug connector) |
| 3 | Compression spring (spring element) |
| 4a, 4b | Plug jaw (plug section) |
| 5 | Securing pin |
| A, A' | Accumulator (energy storage unit) |
| B | Actuating handle |
| D1, D2 | Pivot axis |
| E | Electric motor |
| K | Chain ring |
| R | Bicycle frame (carrier) |
| RT | Down tube (frame part/carrier) |
| S | Lock |
| T | Pedal crank |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive apparatus for use in an electric bicycle, the drive apparatus comprising:
an electric motor;
an energy storage unit configured to supply electrical energy to the electric motor and including a first plug connector; and
a carrier including a second plug connector connected to the first plug connector to electrically connect the energy storage unit to the electric motor, wherein the carrier releasably holds the energy storage unit, and wherein the first plug connector is pivotably mounted at the carrier about a first pivot axis, the carrier further including a holder, wherein the first plug connector is disposed on a connecting component pivotally mounted to the holder about a first pivot axis, wherein the connecting component forms two pivot bearing sections that engage the holder in a pivotable manner, wherein the connecting component is at least partially disposed in an intermediate space between the two pivot bearing sections, wherein the energy storage unit is mounted in a pivotable manner to the holder about a second pivot axis.

2. The drive apparatus of claim 1, wherein at least one plug section is provided at the energy storage unit and is inserted at a pivot bearing section of the holder, wherein the holder defines the second pivot axis.

3. The drive apparatus of claim 2, wherein the energy storage unit pivotable about the second pivot axis between an operating position and a removal position, wherein when the energy storage unit is in the removal position, the plug section is removable from the pivot bearing section so that the energy storage unit may be removed from the carrier.

4. The drive apparatus of claim 3, wherein the second pivot axis is parallel to the first pivot axis.

5. A drive apparatus for use in an electric bicycle, the drive apparatus comprising:
an electric motor;
an energy storage unit configured to supply electrical energy to the electric motor and including a first plug connector; and
a carrier including a second plug connector, connected to the first plug connector to electrically connect the energy storage unit to the electric motor, wherein the carrier releasably holds the energy storage unit, and wherein the first plug connector is pivotably mounted at the carrier about a first pivot axis, wherein the first plug connector is mounted so that the first plug is repositionable with respect to the carrier and perpendicular to the first pivot axis.

6. The drive apparatus of claim 5, wherein the first plug connector is mounted so that the first plug connector is configured to be repositioned in a direction perpendicular to the first pivot axis.

7. The drive apparatus of claim 2, wherein the pivot bearing sections are each rotatably mounted and are repositionable within a bearing guide that extends perpendicularly to the first pivot axis of a bearing section.

8. A drive apparatus for use in an electric bicycle, the drive apparatus comprising:
an electric motor;
an energy storage unit configured to supply electrical energy to the electric motor and including a first plug connector; and
a carrier including a second plug connector, connected to the first plug connector to electrically connect the energy storage unit to the electric motor, wherein the carrier releasably holds the energy storage unit, and wherein the first plug connector is pivotably mounted at the carrier about a first pivot axis, wherein the first plug connector is spring-loaded and moveable in a direction that is perpendicular to the first pivot axis.

9. The drive apparatus of claim 8, further comprising at least one spring element arranged between the two bearing sections so that the first plug connector is spring-loaded.

10. The drive apparatus of claim 1, wherein the first plug connector and/or the second plug connector is/are formed by a round plug.

11. The drive apparatus of claim 1, wherein the carrier is formed by a frame of the electric bicycle or by a component that is to be mounted on the frame.

12. The drive apparatus of claim 5, wherein the carrier is formed by a frame of the electric bicycle or by a component that is to be mounted on the frame.

13. The drive apparatus of claim 8, wherein the carrier is formed by a frame of the electric bicycle or by a component that is to be mounted on the frame.

* * * * *